Nov. 22, 1927.
T. J. SMITH
1,650,472
THREE-ROW STALK CUTTER
Filed May 20, 1925     3 Sheets-Sheet 1
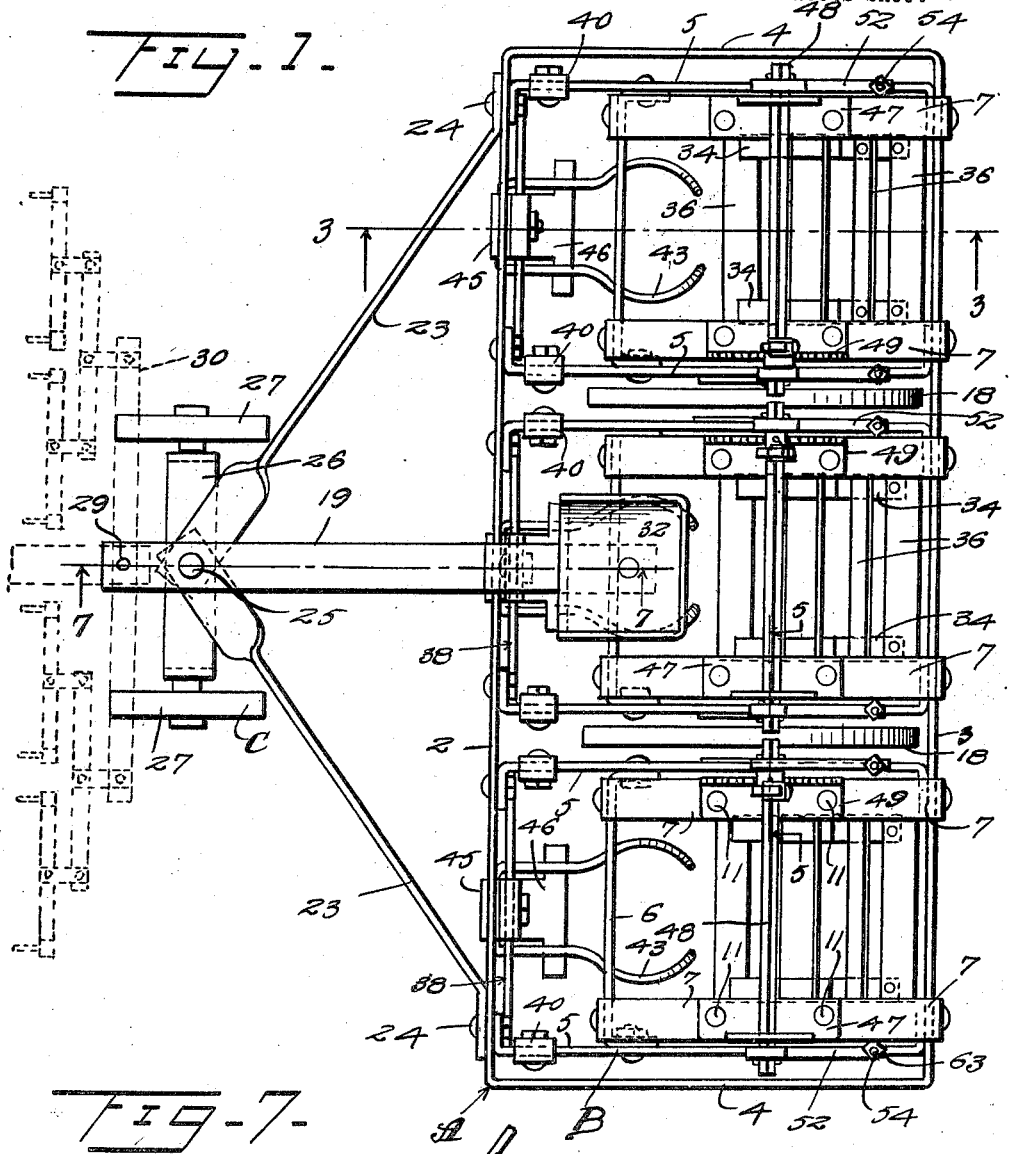
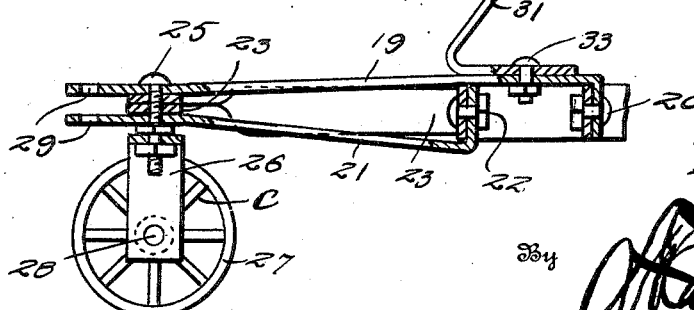
Inventor
T. J. Smith

Nov. 22, 1927.

T. J. SMITH

THREE-ROW STALK CUTTER

Filed May 20, 1925

Inventor
T. J. Smith

Patented Nov. 22, 1927.

1,650,472

UNITED STATES PATENT OFFICE.

THOMAS J. SMITH, OF CLEBURNE, TEXAS.

THREE-ROW STALK CUTTER.

Application filed May 20, 1925. Serial No. 31,561.

This invention relates to stalk cutters, and it consists of the novel construction, combination and arrangement of parts hereinafter fully described and claimed, and illustrated in the accompanying drawings, wherein:

Figure 1 is a top plan view of the stalk cutter;

Figure 2 is a view in side elevation of the stalk cutter;

Figure 5 is a detail sectional view taken on the plane indicated by the line 5—5 of Figure 1;

Figure 6 is a detail sectional view taken on the vertical plane indicated by the line 6—6 of Figure 5, and Figure 7 is a similar view taken on the vertical plane indicated by the line 7—7 of Figure 1.

Corresponding and like parts are referred to in the following description, and designated in the several views of the accompanying drawings, by similar reference characters.

Figure 3:
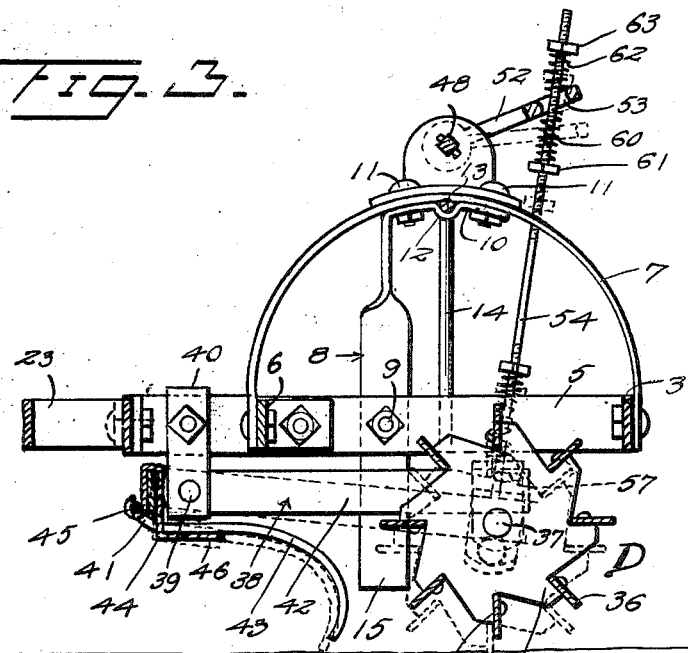
Figure 3 is a sectional view taken on the vertical plane indicated by the line 3—3 of Figure 1.
Figure 4:
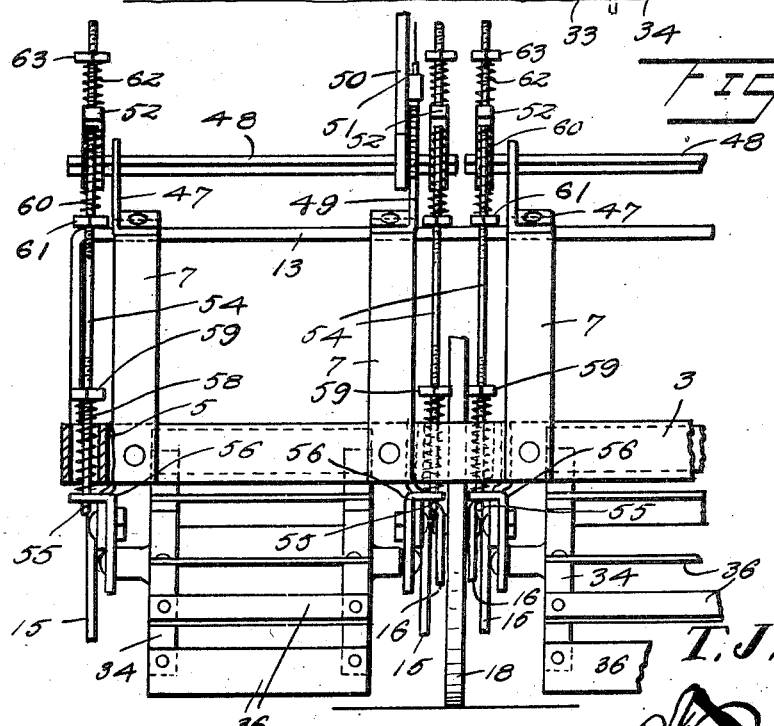
Figure 4 is a view in rear elevation of a fragmentary portion of the stalk cutter.

The stalk cutter comprises an oblong main frame 1 of which 2 is the front, 3 the rear and 4 the end members. End and center supplemental frames B each comprising a pair of transverse members 5 and a longitudinal member 6, are secured to and between the main frame members 2 and 3. Arcuate supports 7 extending transversely of the main frame A, are secured at their lower ends to the supplemental frame members 6 and the main frame member 3. Vertical braces 8 extending above and below the supplemental frame members 5 and secured thereto by bolts 9, are provided at their upper ends with rearwardly directed extensions 10 which are secured to the under sides of the braces 7 by bolts 11 and which are downwardly offset between the bolts 11 to provide loops 12 for the reception of a horizontally disposed and longitudinally extending brace rod 13. The rod 13 is provided with downwardly extending end members 14 which are secured to the end members 4 of main frame 1. The lower end portions 15 of each pair of braces 8, a pair of braces being connected to each supplemental frame B, are outwardly offset with respect to each other to provide guides, the purpose of which will presently appear. The adjacent members 5 of the end and center supplemental frames B have secured thereto bearing brackets 16 in which are journaled the axles 17 of wheels 18.

A tongue 19 is secured as at 20 to the member 6 of the center supplemental frame B. A longitudinal brace 21 underlies the tongue 19 and is secured to the main frame member 2 as at 22. Diagonal braces 23 have their rear ends secured as at 24 to the main frame member 2. The front ends of these braces are positioned between the tongue 19 and brace 21, and these parts are connected by a bolt 25. A truck C is pivotally connected to the parts 19, 21 and 23 by the bolt 25, and it comprises an inverted U-shaped frame 26 to the side members of which wheels 27 are connected by axles 28. The front ends of the tongue 19 and brace 22 are provided with alined openings 29 to permit a draft mechanism, such as that indicated by dotted lines in Figure 1 and designated 30, to be secured thereto. A support 31 for a seat 32 is secured as at 33 to the tongue 19.

A cutter D is connected to each supplemental frame B, and comprises disks 34 having their peripheries notched to provide diametrical shoulders 35. Blades 36 are secured to the shoulders 35 and project beyond the peripheries of the disks 34. The cutters D are rotatably connected as at 37 to drag frames 38. These frames are U-shaped and pivotally connected as at 39 to hangers 40 secured to the supplemental frame members 5. The hangers 40 are located adjacent the main frame member 2, and the drag frames 38 extend rearwardly from the hangers. The cross members 41 of the drag frames 38 are located in advance of the hangers 40, and the side members 42 of each drag frame 38 are located between each pair of guides 15. The guides 15 prevent any horizontal movement of the drag frames 38, and due thereto the cutters D are caused to follow straight paths. As the drag frames 38 are pivotally mounted, the cutters D will effectively function on uneven ground and can be lowered into operative or raised into inoperative position. Forks 43 are arranged in advance of the cutters D, and are adapted to cause any stalks lying on the ground to assume a position parallel to the direction of travel of the cutters. Brackets 44 are secured to the draft frame members 41, and are provided with eyes 45 in which the forks 43 are pivotally supported and stops 46 upon which the forks rest and which are adapted to limit the downward movement of the forks.

Brackets 47 are secured to the upper sides of each pair of supports 7 by the bolts 11, and each pair of brackets is provided with bearings in which a shaft 48 is journaled. One bracket of each pair is provided with a notched arcuate edge 49. A lever 50 is secured to each shaft 48 and is provided with spring pressed dogs 51 adapted to engage the notched edge 49 to hold the shaft against casual rotation. A pair of arms 52 is fixed to each shaft 48 and they are provided with elongated slots 53 through which rods 54 pass. Each pair of rods 54 is secured as at 55 to brackets 56 carried by the drag frame members 42 and in which the axles 37 of the cutters D are journaled. The connection 55 between the rods 54 and brackets 56 is such that the cutters D may move upwardly and downwardly with respect to the rods 54, the downward movement of the cutters with respect to the rods being limited by the lower angular ends 57 of the rods. Springs 58 are mounted upon the rods 54 between the brackets 56 and nuts 59 having threaded engagement with the rods. Springs 60 are mounted upon the rods 54 between the arms 50 and nuts 61 having threaded engagement with the rods, and springs 62 are mounted between the arms 52 and nuts 63 having threaded engagement with the rods, the springs 60 being located below and the springs 62 above the arms 52. The shafts 48, the levers 50 and the rods 54 together with the parts associated therewith provide means by which the cutters D may be yieldingly held in contact with the ground or supported out of contact with the ground.

From the foregoing description taken in connection with the accompanying drawings, it should be apparent that I have provided a three-row stalk cutter which is comparatively simple, durable and efficient, that due to the wheels 18 and tongue truck C, the machine may be readily drawn over the ground, and that the cutters D may be readily moved into operative or inoperative position and yieldingly maintained in the former position.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. A machine of the class described comprising a wheeled frame, a drag frame pivoted thereto, a cutter on said drag frame, arched supporting members rising from the wheeled frame, a brace rod for the wheeled frame disposed against the under surface of the supporting members, substantially vertical braces connected to the wheeled frame, said braces having extensions, brackets rising from the supporting members, fastening means common to said extensions and brackets and passing through the supporting members, a shaft spanning said brackets, and journaled thereon, a crank extending from said shaft, and a yielding connection between said crank and drag frame.

2. A machine of the class described comprising a wheeled frame, a drag frame pivoted thereto, a cutter carried by the drag frame, rods rising from the drag frame, arched supporting elements for the wheeled frame, a shaft spanning said supporting elements, brackets on said supporting elements, said brackets having bearings for said shaft, one of said brackets being formed into elongated segments, a lever to operate said shaft, means on said lever to coact with the segments, cranks on said shaft, said cranks having elongated slots through which the rods pass, springs on said rods above and below and engaging the cranks, brace members connected to the supporting elements adjacent the upper portions thereof and to the main frame, a brace rod for the wheeled frame, said brace members having extensions securing said rod to the supporting elements, securing means common to the brackets and extensions and passing through the supporting elements, said brace members extending below the drag frame to constitute guides to prevent displacing movement of the drag frame.

In testimony whereof I affix my signature.

THOMAS J. SMITH.